United States Patent [19]

Blonder

[11] Patent Number: 5,802,275
[45] Date of Patent: Sep. 1, 1998

[54] ISOLATION OF NON-SECURE SOFTWARE FROM SECURE SOFTWARE TO LIMIT VIRUS INFECTION

[75] Inventor: Greg E. Blonder, Summit, N.J.

[73] Assignee: Lucent Technologies Inc., Murray Hill, N.J.

[21] Appl. No.: 263,850

[22] Filed: Jun. 22, 1994

[51] Int. Cl.$^6$ .................... G06F 13/00; G11B 23/28
[52] U.S. Cl. .................... 395/186; 380/4; 380/25
[58] Field of Search .................... 395/575, 700, 395/186, 187.01, 188.01; 380/4, 3, 25, 50, 23; 364/286.4, 286.5, 286.3

[56] References Cited

U.S. PATENT DOCUMENTS

| | | | |
|---|---|---|---|
| 4,168,396 | 9/1979 | Best | 178/22 |
| 4,465,901 | 8/1984 | Best | 178/22.08 |
| 4,562,305 | 12/1985 | Gaffney, Jr. | 178/22.08 |
| 4,847,902 | 7/1989 | Hampson | 380/4 |
| 4,864,616 | 9/1989 | Pond et al. | 380/25 |
| 5,008,936 | 4/1991 | Hamilton et al. | 380/50 |
| 5,109,413 | 4/1992 | Comerford et al. | 380/4 |
| 5,133,065 | 7/1992 | Cheffetz et al. | 395/575 |
| 5,224,166 | 6/1993 | Hartman, Jr. | 380/50 |
| 5,278,901 | 1/1994 | Shieh et al. | 380/4 |
| 5,337,357 | 8/1994 | Chou et al. | 380/4 |
| 5,359,659 | 10/1994 | Rosenthal | 380/4 |
| 5,361,359 | 11/1994 | Tajalli et al. | 395/700 |

FOREIGN PATENT DOCUMENTS

| | | | |
|---|---|---|---|
| 0570123 | 11/1993 | European Pat. Off. | G06F 12/14 |
| 153747 | 3/1991 | Taiwan . | |
| 167755 | 9/1991 | Taiwan | G06F 9/44 |
| 9407204 | 3/1994 | WIPO | G06F 15/21 |
| 9422242 | 9/1994 | WIPO | H04B 10/10 |

*Primary Examiner*—Robert W. Beausoliel, Jr.
*Assistant Examiner*—Norman M. Wright
*Attorney, Agent, or Firm*—David Volejnicek

[57] ABSTRACT

A personal digital assistant (PDA) receives and executes both encrypted and unencrypted programs. Encrypted programs are fairly secure from virus infection, while unencrypted programs are not. To prevent contamination of the PDA with infected encrypted programs, only those encrypted programs that are keyed to the individual PDA's unique device identifier can be decrypted and executed by that PDA. To prevent non-secure programs from corrupting secure programs and their data, programs that were received unencrypted are prevented from modifying programs that were received encrypted as well as data generated by their execution. When a user suspects a virus infection, the user pushes a special button on the PDA that prevents execution of programs that were received unencrypted and hence are suspected of being infected, while allowing continued execution of programs that were received encrypted and hence are presumed to be secure.

9 Claims, 3 Drawing Sheets

ISOLATION OF NON-SECURE SOFTWARE FROM SECURE SOFTWARE TO LIMIT VIRUS INFECTION

TECHNICAL FIELD

This invention relates to stored-program controlled machines and to software virus counter-measures in such machines.

BACKGROUND OF THE INVENTION

Stored-program controlled machines, especially personal computers (PCs) and personal digital assistants (PDAs), are becoming widely owned and operated in an environment where software is increasingly freely shared between users. In this environment, software viruses are likely to spread as rapidly as any disease would in a corresponding environment of living organisms. Effective ways to reduce the damage of virus infections are therefore becoming ever-more important.

Presently, most software intended for wide distribution is sold "shrink-wrapped". That is, each copy of the software is identical to all other copies, and the copies run on machines that are fungible for purposes of executing individual copies of the software. When a machine gets infected with a software virus, special virus-detection software may be used to identify and eliminate the virus and its effects. A balance of sorts exists: viruses are easy to write because each target program is identical, but infections can be easily detected because, once a particular virus is found, its "signature" can be tracked to other machines. However, this balance is easily upset when a virus is quickly disseminated, such as often happens in an environment of widespread software sharing between users. Before the virus' signature can be distributed to the virus-detection software, many or even most machines in the environment may become infected. This may be a particular problem with PDAs. For example, PDAs might be used by students who share information throughout the day. Wireless infra-red communications make such sharing simple and fast. A new virus might easily sweep through a school in days, long before the virus-detection software can be adapted to recognize the new threat.

Preventing users from sharing software with each other is one effective way of preventing the spread of software viruses. For example, each machine may be provided with a built-in unique identifier, and a software supplier may provide software only in encrypted form that requires a particular key, such as a particular machine's unique identifier, for decryption. In this manner, the supplier can restrict the use of each copy of the software to only one particular target machine. Since only the target machine can decrypt an individual copy of the encrypted software, the software cannot be shared, and hence a virus that infects a copy of the software cannot readily spread to other machines. Clearly, this greatly slows the rate of infection.

Until now, most software suppliers have avoided distributing copies of software that are keyed to individual machines, primarily because it would be a nightmare for retail stores to stock appropriate wares. With today's high-speed data networks and PDAs with convenient wireless connections, individually-keyed encrypted software could be easily distributed and downloaded into target machines, and quickly be decrypted by today's fast microprocessors. However, in order for the protection provided by the keying mechanism to remain effective, this would require all of the software to be distributed through either a single or a limited number of secure and trustworthy distribution channels who would be entrusted with knowledge of individual machines' identifiers and who would be relied upon to key copies of software for the individual target machines. One likely such distribution channel would be the manufacturer of the target machines. But software suppliers are likely to object to participating in a distribution channel for their products that they would not control.

SUMMARY OF THE INVENTION

This invention is directed to solving these and other problems and disadvantages of the prior art. Generally according to the invention, both encrypted and unencrypted (clear) software is allowed to enter, and execute on, an individual machine. While the acceptance of clear software exposes the machine to being invaded by a virus, the damage that such a virus may inflict is limited by means of an arrangement such as an actuator that, when it has been actuated, isolates the clear software from the machine, for example by preventing the machine from accepting, or executing accepted, clear software, without affecting software that was received in encrypted form. Preferably, clear software is only allowed to read, but is not allowed to write over, data created or protected by the encrypted software. Also preferably, the clear software is not allowed to write over the encrypted software's portion of memory.

Specifically according to the invention, a program-execution apparatus comprises a receiver for receiving both encrypted programs and unencrypted programs, storage for storing the received programs, a program executor for executing the stored programs, and an arrangement that selectively prevents the program executor from executing the stored programs that were received unencrypted while it allows the program executor to execute the stored programs that were received encrypted. Illustratively, the arrangement comprises a manually-actuatable actuator that, when actuated, prevents the program executor from executing the stored programs that were received unencrypted.

Encrypted programs are deemed to be fairly secure from virus infection, while unencrypted programs are not. Thus, when a virus infection of the program-execution apparatus is suspected, the abovementioned arrangement is engaged to prevent execution of the programs that were received unencrypted and hence are suspected of being infected by virus. Even while execution of the programs that were received unencrypted is prevented, execution is allowed of programs that were received encrypted and hence are presumed to not be infected. In this manner, the non-secure programs and their likely virus infection are isolated from the apparatus without interfering with functioning of the apparatus that is not likely to have been affected by the infection.

Preferably, to prevent unauthorized sharing of encrypted programs and thereby to prevent any possibility of contamination of an individual program-execution apparatus with a virus-infected encrypted program from another program-execution apparatus, each individual program-execution apparatus has its own unique apparatus identifier. The program executor executes only unencrypted programs, and each program-execution apparatus further includes a decryptor that decrypts into unencrypted programs only those of the received encrypted programs that are encrypted via an encryption scheme that is based on the apparatus identifier of that particular apparatus.

Further preferably, to prevent the non-secure programs—those received in unencrypted form—from corrupting secure programs—those received in encrypted form—and their data, programs that were received unencrypted are prevented from modifying programs that were received encrypted as well as data generated by their execution.

These and other advantages and features of the invention will become more apparent from the following description of an illustrative embodiment of the invention taken together with the drawing.

DETAILED DESCRIPTION

Figure 1:
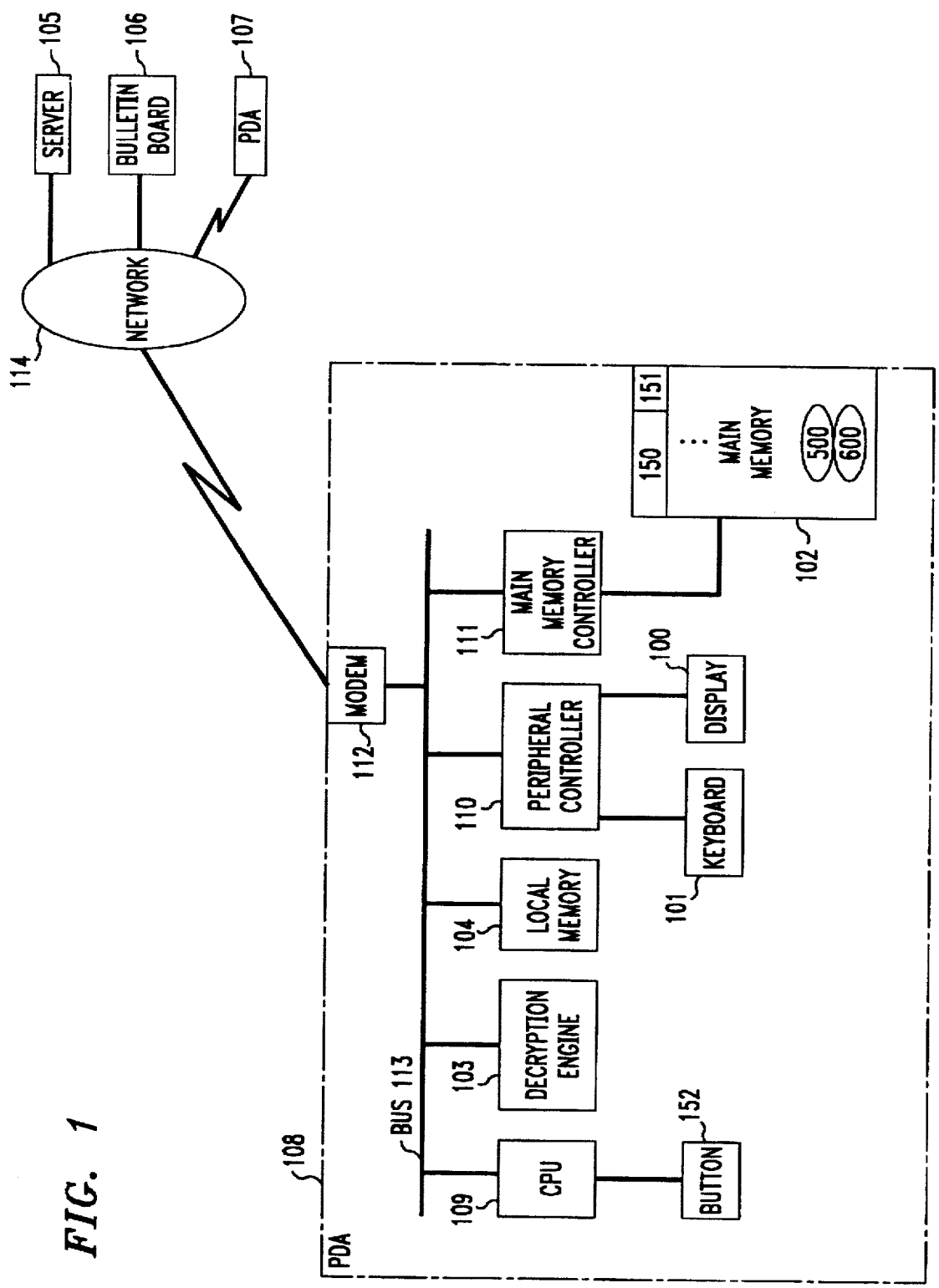
FIG. 1 is a block diagram of an illustrative telecommunication system and of a personal digital assistant thereof, which includes an illustrative embodiment of the invention.

FIG. 1 shows an illustrative telecommunications system that comprises a plurality of PDAs 107–108. The PDAs 107–108 are interconnected with each other and with other communications entities, such as a server 105 and a bulletin board 106, by a network 114. Connection of PDAs 107–108 to network 114 is either wired, such as via telephone lines, or wireless, such as via infrared (IR) links. As described so far, the telecommunications system of FIG. 1 and its elements are conventional.

PDAs 107 and 108 are also substantially conventional in structure. For illustration, the structure of a representative PDA 108 is shown in FIG. 1. PDA 108 comprises a central processing unit (CPU) 109 for executing programs, a decryption engine 103 for decrypting encrypted information, a local memory 104 for storing data and programs that are presently needed by CPU 109 and decryption engine 103, a peripheral controller that interfaces CPU 109 to a keyboard 101 and a display 100, a main memory 102 for storing all data and programs required by PDA 108, and a main memory controller 111 for interfacing CPU 109 to main memory 102. Elements 103, 104, 109, 110, and 111 are interconnected for communication by a bus 113. Also connected to bus 113 is a transceiver modem 112 that communicatively couples PDA 108 to network 114.

According to the invention, programs distributed in both encrypted and clear (unencrypted) form are allowed to reside and selectively execute on PDA 108. An illustrative procedure for obtaining and installing encrypted software is flow-charted in FIG. 2, while an illustrative procedure for obtaining and installing clear software is flowcharted in FIG. 3.

If the user of PDA 108 wishes to purchase for PDA 108 a new software product that is distributed in encrypted form, the user invokes execution of a software-purchase program 500 on PDA 108, at step 200. Execution of program 500 causes modem 112 to access (call) the vendor's server 105 through network 114, at step 202. Once connected to server 105, at step 203, program 500 passes the identifier (e.g., name, or catalog number) of the desired software product to server 105, at step 204, and also passes a unique device identifier (ID) of PDA 108 to server 105, at step 206. In response to receipt of the software identifier and device ID, at step 205, server 105 checks a database to ensure that the identified PDA 108 is authorized to receive the identified software, at step 208. For example, server 105 checks whether PDA 108 has pre-paid for the software, or has a valid account with server 105 which can be debited by the amount of the purchase price.

Assuming that PDA 108 is found at step 208 to be authorized to receive the identified software, server 105 encrypts the identified software product with an encryption key that is based on the received ID, at step 210, and passes the encrypted software to PDA 108 via network 114, at step 212. Server 105 then makes a record of this transaction, at step 215. In response to receipt of the software by PDA 108, at step 213, program 500 causes the received encrypted software to be stored in local memory 104, at step 214, and activates decryption engine 103.

In a conventional manner, such as recognition of a valid header or checksum and/or instruction set, decryption engine 103 determines whether the received software is acceptably encrypted, at step 218. This step will detect, and reject, unencrypted software as well as encrypted software which has been modified subsequently to being encrypted. It will also reject encrypted software that has been encrypted with an encryption key that is based on the device ID of a machine other than the receiving machine. If the software is not acceptably encrypted, it is rejected, at step 219. If the software is found to be acceptably encrypted, decryption engine 103 then uses a decryption key that is based on the ID of PDA 108 to decrypt the received software, at step 220. The fact that both the encryption and decryption keys are based on the ID of PDA 108 ensures that only PDA 108 and no other PDA can decrypt the encrypted software. Decryption engine 103 then stores the decrypted software in main memory 102, at step 222, and causes this software to be identified as secure software, at step 224. For example, decryption engine 103 identifies this software as secure software to main memory controller 111, and main memory controller 111 stores this information for future use. Or, decryption engine sets a special security bit 151, that is included with every word 150 in main memory 102, for all memory words 150 that store the decrypted software. Any data created by execution of this secure software and stored in main memory 102 will also be identified as secure, in like manner.

Figure 2:
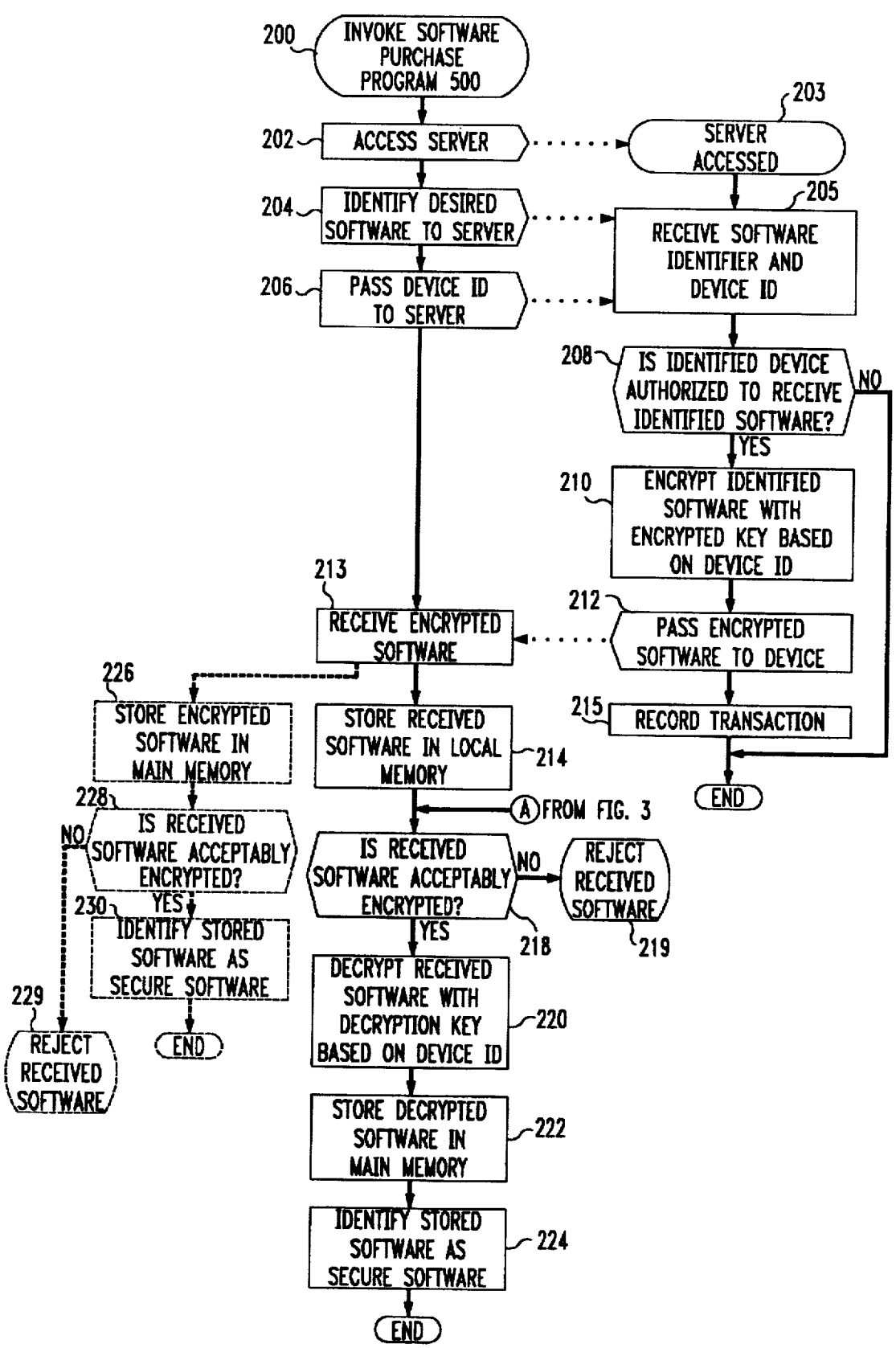
FIG. 2 is a flow diagram of an illustrative procedure for obtaining encrypted software at a PDA of the system of FIG. 1.
Figure 3:
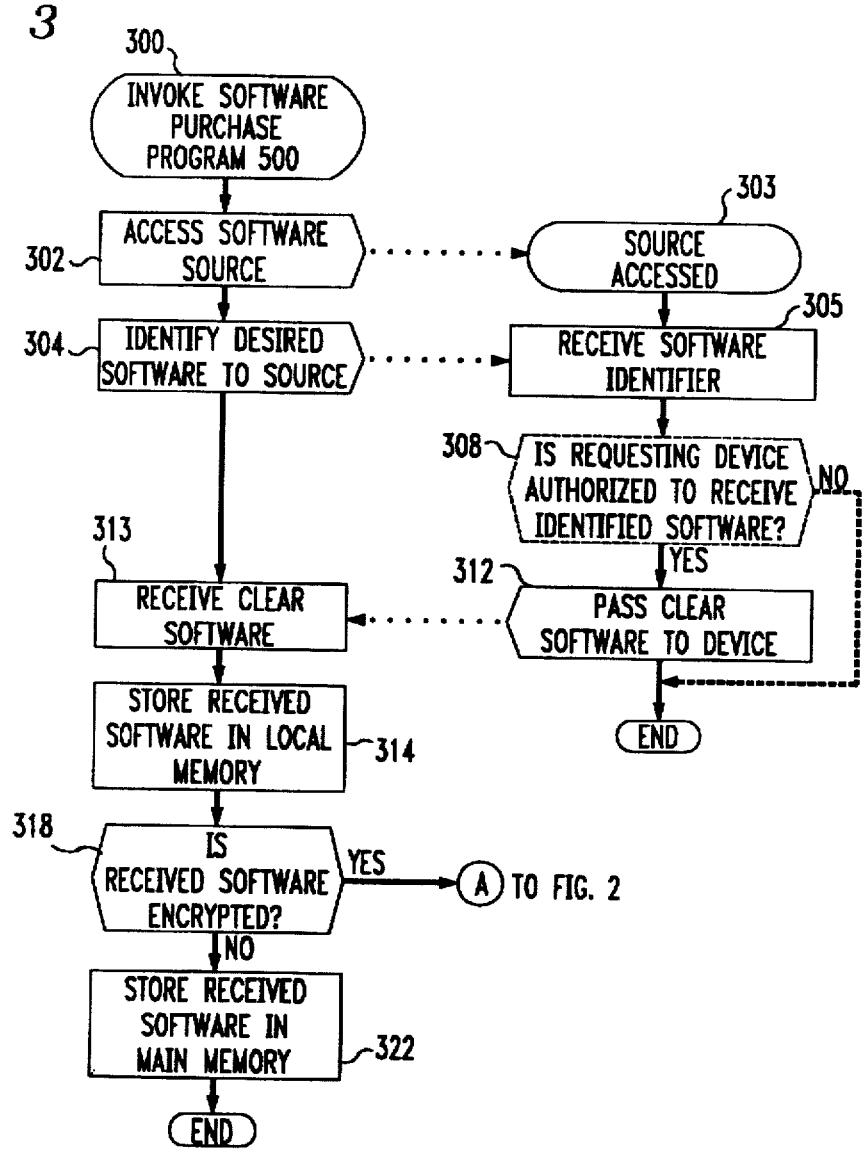
FIG. 3 is a flow diagram of an illustrative procedure for obtaining clear software at a PDA of the system of FIG. 1.

Alternatively, as shown in dashed lines in FIG. 2, upon its receipt by PDA 108 at step 213, the received software is stored in encrypted form in main memory 102, at step 226, is checked for being acceptably encrypted, at step 228, and if it is found to be acceptably encrypted, is identified as secure software, e.g., by means of setting security bit 151 of main memory words 150 that store the encrypted software, at step 230. If found to not be acceptably encrypted, the software is rejected, at step 229. Decryption engine 103 then decrypts the stored encrypted software each time that execution of that software is invoked. This is particularly useful when main memory 102 is an external memory (e.g., a PCMCIA flash memory card), removable from PDA 108 and connectable to another PDA. Had the software been stored in decrypted form on the removable memory, a virus could be introduced by changing both the code and the security bit 151. Storage in encrypted form prevents tampering. (Note that the use of a security code in this case is merely a matter of convenience, since decryption engine 103 still checks if the software is encrypted.)

If the user of PDA 108 wishes to obtain for PDA 108 a new software product that is distributed in clear form, the user invokes execution of the software purchase program 500 on PDA 108, at step 300. Execution of program 500 causes modem 112 to access a vendor's server 105 or a bulletin board 106 from which the software is obtainable, at step 302. Once connected to the source of the software, at step 303, program 500 passes the identifier of the desired software product to the source, at step 304. In response to receipt of the software identifier, at step 305, the source optionally engages PDA 108 in communications to determine whether PDA 108 is authorized to receive the identified software, at step 308. For example, the source may request PDA 108 to provide the device ID of PDA 108, and may then use this ID to undertake the same determination as was described for step 208 of FIG. 2. Assuming that the check of step 308 either is not performed, or is performed and successfully passes, the software source passes the desired software to PDA 108 via network 114, at step 312. In response to receipt of this software by PDA 108, at step 313, program 500 causes the received software to be stored in local memory 104, at step 314, and activates decryption engine 103.

In the conventional manner described for step 218 of FIG. 2, decryption engine 103 determines whether the received software is not encrypted, at step 318. If the software is found to be encrypted, steps 218 et seq. of FIG. 2 are invoked. If the software is found to not be encrypted, decryption engine 103 stores the received unencrypted software in main memory 102, at step 222. The software is not identified as secure, e.g., bits 151 of words 150 that store the software are not set. Any data created by execution of this software will likewise not be identified as secure.

Alternatively, PDA 108 can also receive clear software from another PDA via a conventional file transfer.

Figure 4:
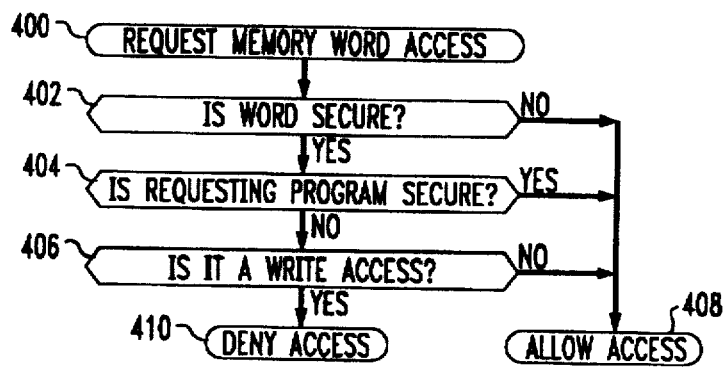
FIG. 4 is a flow diagram of a procedure for preventing clear software from changing data or instructions of encrypted software in the system of FIG. 1.

During execution of programs by PDA 108, only programs that are identified as secure are allowed to change any words 150 (either data words or instruction words) that are identified as secure. Clear programs are allowed to change words 150 that are not identified as secure, but clear programs may only read words 150 that are identified as secure. This is illustrated in FIG. 4.

Whenever an executing program causes CPU 109 to request access to a word 150 of main memory 102, execution of a secure program 600 is invoked, at step 400. Program 600 checks whether the word 150 that is sought to be accessed is identified (see, e.g., discussion of step 224 of FIG. 2) as secure, at step 402. If not, the access is allowed, at step 408; if so, program 600 checks whether the requesting program is identified as a secure program, at step 404. If so, the access is allowed, at step 408; if not, program 600 checks whether the access is a read or a write access, at step 406. If it is a read access, it is allowed, at step 408; if it is a write access, it is denied, at step 410.

If at any time PDA 108 appears to be infected with a virus (e.g., it exhibits erratic behavior, performs unusually slowly, etc.), the user of PDA 108 presses a button 152 on PDA 108. Button 152 is interfaced to CPU 109, and pressing of button 152 prevents CPU 109 from executing clear software. Illustratively, pressing of button 152 sends a command to CPU 109 that directs CPU 109 to stop executing any software that is not identified as secure. Effectively, pressing of button 152 isolates the clear software, which is the most likely software to be infected by virus, and hence isolates the virus itself. Execution of secure software is allowed to proceed unimpeded.

Alternatively, infection with a virus may also be detected automatically by PDA 108, for example, by execution of maintenance and diagnostic software, which may then automatically undertake the requisite action to isolate the clear software.

Of course, various changes and modifications to the illustrative embodiment described above will be apparent to those skilled in the art. For example, instead of each word 150 of main memory 102 being marked with a security bit, the marking may be done on a per-block basis whereby each block has either a security bit or a security word associated therewith. Or, encrypted and clear software may be stored in different memory portions, or even in different memories, each one of which is identified either as secure or as clear. Also, the secure software may choose not to set the security indication for data that it creates, thereby allowing clear software to modify that data.

Furthermore, if PDA 108 is ever lost by its user, server 105 can reload the encrypted software into a replacement PDA purchased by the user, because server 105 has maintained a record of previous sales of encrypted software to this user (see step 215 of FIG. 2). Similarly, if the user of PDA 108 replaces PDA 108 with an upgraded unit, server 105 can load the upgraded unit with new, upgraded versions of the encrypted software that the user had owned. In either case, however, the user loses the clear software, unless the user has made a backup copy thereof. Server 105 may optionally provide users with a backup service, whereby users periodically access server 105 and transfer their non-secure files, as well as secure data files, to server 105, which then stores these files until such time as the users request server 105 to transfer them back to their PDAs. Such changes and modifications can be made without departing from the spirit and the scope of the invention and without diminishing its attendant advantages. It is therefore intended that such changes and modifications be covered by the following claims.

I claim:

1. A program-execution apparatus comprising:

means for receiving both encrypted programs and unencrypted programs;

means for storing the received programs;

means for executing the stored programs; and means for selectively preventing the executing means from executing the stored programs that were received unencrypted, while allowing the executing means to execute the stored programs that were received encrypted.

2. The apparatus of claim 1 wherein:

the preventing and allowing means comprise a manually-actuatable actuator that, when actuated, prevents the executing means from executing the stored programs that were received unencrypted.

3. The apparatus of claim 1 having a unique apparatus identifier, wherein the executing means execute only unencrypted programs; and the apparatus further comprises means for decrypting into unencrypted programs only those of the received encrypted programs that are encrypted via an encryption arrangement that is based on said unique apparatus identifier.

4. The apparatus of claim 1 wherein execution of a program may modify another program, further comprising:

means for preventing the programs that were received unencrypted from modifying the programs that were received encrypted.

5. The apparatus of claim 1 wherein execution of a program may modify either another program or data generated by the other program, wherein:

the storing means include means for storing data generated by execution of the stored programs by the executing means;

means for identifying both those stored programs that were received encrypted and those stored data that were generated by execution of the programs that were received encrypted; and means for preventing the programs that were received unencrypted from modifying both the identified programs and the identified data.

6. A program-execution apparatus having a unique apparatus identifier and comprising:

a receiver for receiving both encrypted programs and unencrypted programs;

a decryption engine for decrypting, into unencrypted programs, only those of the encrypted programs that are encrypted via an encryption arrangement that is based on said unique apparatus identifier;

a memory for storing both the received programs and data generated by execution of the received programs;

a processor for executing only unencrypted said stored programs, wherein execution of an unencrypted stored program may modify either another stored program or data generated by the other stored program;

means for identifying both those stored programs that were received encrypted and those stored data that were generated by execution of the programs that were received encrypted;

means for preventing the programs that were received unencrypted from modifying both the identified programs and the identified data; and means for selectively preventing the processor from executing the stored programs not identified by the identifying means while allowing the processor to execute the stored programs identified by the identifying means.

7. The apparatus of claim 6 wherein:

the preventing and allowing means comprise a manually-activable actuator that, when actuated, prevents the processor from executing the stored programs not identified by the identifying means.

8. The apparatus of claim 6 wherein:

the apparatus is portable, and the receiver is a wireless receiver.

9. The apparatus of claim 8 wherein:

the portable apparatus is a personal digital assistant, and the wireless receiver is an infrared receiver.

* * * * *